(12) United States Patent
Vaughan, Jr. et al.

(10) Patent No.: US 9,826,828 B1
(45) Date of Patent: Nov. 28, 2017

(54) CABINET ASSEMBLY SYSTEM UTILIZING COOPERATING GROOVED COMPONENTS

(71) Applicants: David E. Vaughan, Jr., Chesapeake, VA (US); David Packard, Bear Creek, AL (US)

(72) Inventors: David E. Vaughan, Jr., Chesapeake, VA (US); David Packard, Bear Creek, AL (US)

( * ) Notice: Subject to any disclaimer, the term of this patent is extended or adjusted under 35 U.S.C. 154(b) by 0 days.

(21) Appl. No.: 15/224,883

(22) Filed: Aug. 1, 2016

(51) Int. Cl.
| | |
|---|---|
| A47B 47/00 | (2006.01) |
| A47B 96/06 | (2006.01) |
| A47B 55/00 | (2006.01) |
| A47B 81/00 | (2006.01) |
| A47B 63/00 | (2006.01) |

(52) U.S. Cl.
CPC ...... *A47B 47/0066* (2013.01); *A47B 47/0075* (2013.01); *A47B 55/00* (2013.01); *A47B 63/00* (2013.01); *A47B 81/00* (2013.01); *A47B 96/067* (2013.01)

(58) Field of Classification Search
CPC .. A47B 47/0066; A47B 47/0075; A47B 55/00
USPC ........................................................ 312/263
See application file for complete search history.

(56) References Cited

U.S. PATENT DOCUMENTS

| | | | |
|---|---|---|---|
| 2,884,296 A | 4/1959 | Meilinger et al. | |
| 3,004,815 A | 10/1961 | O'Kain et al. | |
| 3,347,610 A * | 10/1967 | Pilliod | A47B 47/04 312/108 |
| 3,437,392 A * | 4/1969 | Hilfinger | A47B 55/00 312/257.1 |
| 3,713,718 A * | 1/1973 | Lucci | B65D 9/34 217/12 R |
| 3,892,452 A | 7/1975 | Williams et al. | |
| 4,223,965 A | 9/1980 | Palandrani | |
| 5,152,593 A | 10/1992 | Domenig | |
| 6,502,909 B1 * | 1/2003 | Swilik, Jr. | B01D 46/0002 312/257.1 |
| 8,832,873 B2 | 9/2014 | Kumar | |
| 2006/0273085 A1 * | 12/2006 | Casto | B27G 13/002 220/62 |
| 2007/0039159 A1 * | 2/2007 | Galbreath | F16L 312/04 29/458 |
| 2008/0042532 A1 * | 2/2008 | Crabtree | A47B 47/042 312/257.1 |
| 2010/0079045 A1 * | 4/2010 | Yeh | F16B 12/02 312/263 |
| 2011/0068668 A1 | 3/2011 | Wilson | |
| 2013/0170904 A1 * | 7/2013 | Cappelle | A47B 47/042 403/381 |
| 2015/0230600 A1 * | 8/2015 | Schulte | A47B 47/0066 312/265.5 |
| 2015/0368896 A1 * | 12/2015 | Schulte | E04L 31/54 403/364 |
| 2016/0000220 A1 * | 1/2016 | Devos | A47B 47/042 403/363 |

* cited by examiner

*Primary Examiner* — Daniel J Rohrhoff
(74) *Attorney, Agent, or Firm* — Richard L. Miller (57) ABSTRACT

A cabinet that hangs on a wall and directs forces in such a manner so as to provide a stronger assembly. The cabinet includes a front frame, joinery, and a plurality of panels. The joinery attaches some of the plurality of panels to each other and to the front frame, and directs the forces from the some of the plurality of panels to the front frame so as to provide the stronger assembly.

116 Claims, 9 Drawing Sheets

CABINET ASSEMBLY SYSTEM UTILIZING COOPERATING GROOVED COMPONENTS

BACKGROUND OF THE INVENTION

Field of the Invention

The present invention relates to a cabinet, and more particularly, a cabinet and joinery for assembling a portion of the cabinet.

Description of the Prior Art

Numerous innovations for cabinets have been provided in the prior art that will be described. Even though these innovations may be suitable for the specific individual purposes to which they address, however, they differ from the present invention.

A FIRST EXAMPLE, U.S. Pat. No. 2,884,296, Issued on Apr. 28, 1959, to Meilinger, et al. teaches a construction molding strip that is arranged for slidable engagement with a piece of molding having a similar cross-sectional configuration. The construction molding strip includes channel member having one leg longer than the opposite leg mounted at each side of a web, a first flange mounted on the longer leg parallel to and extending centerwise of the web, and a second flange mounted on the shorter of the legs unidirectionally with the first flange. The second flange is parallel to and extends away from the web. The first flange is disposed a distance from the web sufficient to reciprocally accommodate the second flange thereunder when each of two facing moldings are positioned together. Further included is a longitudinal rib mounted on the web parallel to and spaced from the longer leg in position to prevent transverse displacement of the second flange engaged beneath the first flange whereby two of the construction molding strips are slidably interlocked together.

A SECOND EXAMPLE, U.S. Pat. No. 3,004,815, Issued on Oct. 17, 1961, to O'Kain, et al. teaches a wall cabinet that includes a molded, plastic, and hollow body portion open upon its forward side and an overlying and metallic frame. The marginal portion of the body is peripherally offset to form a forward facing seat. The marginal edge of the seat is provided with a plurality of integral, spaced-apart, and flexible tongues. The frame is proportioned to overlie the marginal portion of the body portion and to extend beyond the body portion to overlie a wall area around a wall opening that receives the body portion. The frame has an intermediate portion that engages upon the seat of the body portion. The frame outwardly from the intermediate portion has a peripheral and rearwardly facing recess. Further included is an inwardly directed rib formed upon the outer marginal edge of the frame. The frame is adapted to engage upon the open side of the body portion with the several tongues engaging the recess in bowed and snapping engagement behind the rib.

A THIRD EXAMPLE, U.S. Pat. No. 3,892,452, Issued on Jul. 1, 1975, to Williams, et al. teaches a modular cabinet system including hanging units and standing cabinet units. The hanging cabinets have sloping sidewalls and a sloping top wall that enable nesting of the cabinets during storage and shipment. A vertical stile is for connecting two base members or platforms of a standing cabinet in which pins in the shape of the frustum of an inverted, quadrangular, and regular pyramid hold the platforms together without the need for additional fasteners. Drawers have sloping sidewalls and a sloping rear wall that enable nesting during storage and shipment, as well as a drawer guide apparatus that prevents horizontal and vertical chatter during the operation of the drawer.

A FOURTH EXAMPLE, U.S. Pat. No. 4,223,965, Issued on Sep. 23, 1980, to Palandrani teaches an enclosure that is useful to house electrical controls where protection from oil, dust, and water is required. The enclosure is made from sheet steel, and is of a generally rectangular shape. The parts forming the walls of the enclosure are constructed in a manner that all welding of the enclosure parts occurs inside the enclosure.

A FIFTH EXAMPLE, U.S. Pat. No. 5,152,593, Issued on Oct. 6, 1992, to Domenig teaches a cabinet assembly system incorporating fastener elements of the hook and loop type or their equivalent, particularly, designed and positioned to enable the supporting walls, floor, and ceiling of a given area to support, temporarily or permanently in pre-selected locations, a plurality of cabinets, shelves, receptacles, and the like, having walls, tips, doors, and floors. The fastener elements are affixed to walls, floor, and ceiling as needed and to the contiguous surfaces of cabinets, shelves, and receptacles directly or with special fastening elements so that these articles can be maintained in an established configuration until more secure fastenings are effected or until there is a decision to rearrange the configuration.

A SIXTH EXAMPLE, U.S. Pat. No. 8,832,873, Issued on Sep. 16, 2014, to Kumar teaches components of a furniture system, in a vertical orientation, having a cabinet with a central opening in an upper section and a plurality of support panels stacked in a laterally oriented position within the central opening. The cabinet is adapted to be placed against a structure, such as, a wall. Engaging items include a television. The cabinet further has a horizontal orientation with a top opening and alternate configuration and function as a bed or sofa. In this configuration, the support panels are repositionable to span the entire horizontal top opening of the cabinet. The repositioning of the components is done by mechanisms, such as, hinges, rails, and/or manually repositioning the components.

A SEVENTH EXAMPLE, U.S. Patent Office Document No. 2007/0039159, Published on Feb. 22, 2007, to Galbreath, et al. teaches a method of producing a fastener free cabinet assembly. An embodiment of the method includes selecting at least two cross rails and at least two stiles. Each rail has a set of projecting tenons formed at opposite ends of the rail. Each tenon further has a contact surface defined at least in part by a first side surface, an end surface, and a second side surface. Each stile has an edge forming a groove shaped mortise. The mortise forms a contact surface to engage with one of the tenons to define a bond gap. The embodiment also includes applying a predetermined amount of adhesive to each set of tenons, and engaging the at least two cross rails and the at least two stiles to form the cabinet assembly. The predetermined amount of adhesive does not exceed a volume of the bond gap.

AN EIGHTH EXAMPLE, U.S. Patent Office Document No. 2011/0068668, Published on Mar. 24, 2011, to Wilson teaches a cabinet assembly including a plurality of wall panels and at least two generally rectangular horizontal support members to define a parallelepiped configuration. The cabinet includes a plurality of elongate corner posts, with at least one for each corner of the parallelepiped configuration. The corner posts selectively support the wall panels in the parallelepiped configuration. Each corner post has a rectangular through bore extending a length of the corner post. Each of the at least two horizontal support members include rectangular through bores aligned with the corner post through bores at each corner of the parallelepiped configuration. A plurality of rectangular splines are provided, with one for each corner of the parallelepiped configuration. Each of the splines is received in the aligned rectangular through bores at one of the corners of the parallelepiped configuration to maintain the cabinet assembly in assembled relationship.

It is apparent now that numerous innovations for cabinets have been provided in the prior art that adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide a cabinet and joinery for assembling a portion of the cabinet that avoids the disadvantages of the prior art.

ANOTHER OBJECT of the present invention is to provide a cabinet and joinery for assembling a portion of the cabinet that is simple and inexpensive to manufacture.

STILL ANOTHER OBJECT of the present invention is to provide a cabinet and joinery for assembling a portion of the cabinet that is simple to use.

BRIEFLY STATED, STILL YET ANOTHER OBJECT of the present invention is to provide a cabinet that hangs on a wall and directs forces in such a manner so as to provide a stronger assembly. The cabinet includes a front frame, joinery, and a plurality of panels. The joinery attaches some of the plurality of panels to each other and to the front frame, and directs the forces from the some of the plurality of panels to the front frame so as to provide the stronger assembly.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows.

A MARSHALING OF REFERENCE NUMERALS UTILIZED IN THE FIGURES OF THE DRAWING

Introductory 20 cabinet of embodiments of present invention for hanging on wall 21 and for directing forces in such manner so as to provide stronger assembly
21 wall

Overall Configuration of Cabinet 20

22 front frame
24 joinery for directing forces from some of plurality of panels 26 to front frame so as to provide stronger assembly
26 plurality of panels

Specific Configuration of Front Frame 22

28 plurality of frame members of front frame 22
30 corners of front frame 22
32 rear surfaces of plurality of frame members 28 of front frame 22, respectively
34 top member of plurality of frame members 28 of front frame 22
36 bottom member of plurality of frame members 28 of front frame 22
38 pair of side members of plurality of frame members 28 of front frame 22
40 blind slots of rear surfaces 32 of plurality of frame members 28 of front frame 22, respectively

Specific Configuration of Plurality of Panels 26

42 top panel of plurality of panels 26
44 bottom panel of plurality of panels 26
46 pair of side panels of plurality of panels 26
48 rear panel of plurality of panels 26
50 front edge of top panel 42 of plurality of panels 26
52 rear edge of top panel 42 of plurality of panels 26
54 pair of side edges of top panel 42 of plurality of panels 26

56 front edge of bottom panel 44 of plurality of panels 26
58 rear edge of bottom panel 44 of plurality of panels 26
60 pair of side edges of bottom panel 44 of plurality of panels 26
62 front edges of pair of side panels 46 of plurality of panels 26, respectively
64 rear edges of pair of side panels 46 of plurality of panels 26, respectively
66 top edges of pair of side panels 46 of plurality of panels 26, respectively
67 bottom edges of pair of side panels 46 of plurality of panels 26, respectively
68 inner surfaces of pair of side panels 46 of plurality of panels 26, respectively
70 top edge of rear panel 48 of plurality of panels 26
72 bottom edge of rear panel 48 of plurality of panels 26
74 pair of side edges of rear panel 48 of plurality of panels 26
76 rear blind slot of each side panel of pair of side panels 46 of plurality of panels 26
78 top blind slot of each side panel of pair of side panels 46 of plurality of panels 26
80 bottom blind slot of each side panel of pair of side panels 46 of plurality of panels 26
82 glue of plurality of panels 26
84 pair of hanging ledgers/cleats of plurality of panels 26 for hanging cabinet 20 onto wall 21
86 rear portions of pair of hanging ledgers/cleats 84 of plurality of panels 26, respectively
88 top/bottom portions of pair of hanging ledgers/cleats 84 of plurality of panels 26, respectively
90 screws of pair of hanging ledgers/cleats 84 of plurality of panels 26
92 pair of reinforcing blocks of plurality of panels 26 for reinforcing cabinet 20 when cabinet 20 is at least 30" wide
94 rear faces of pair of reinforcing blocks 92 of plurality of panels 26, respectively
96 top faces of pair of reinforcing blocks 92 of plurality of panels 26, respectively
98 bottom faces of pair of reinforcing blocks 92 of plurality of panels 26, respectively Specific Configuration of Joinery 24

100 female portion of each joint of joinery 24
102 male portion of each joint of joinery 24
104 first side wall of female portion 100 of each joint of joinery 24
106 second side wall of female portion 100 of each joint of joinery 24
108 bottom wall of female portion 100 of each joint of joinery
110 substantially wedge-shaped recess of second side wall 106 of male portion 102 of each joint of joinery 24
112 first wall defining substantially wedge-shaped recess 110 of second side wall 106 of male portion 102 of each joint of joinery 24
114 second wall defining substantially wedge-shaped recess 110 of second side wall 106 of male portion 102 of each joint of joinery 24
116 smooth concave portion of second wall 114 of substantially wedge-shaped recess 110 of second side wall 106 of male portion 102 of each joint of joinery 24 for eliminating high stress area thereat that would be present if area thereat was not smooth concave portion of second wall of substantially wedge-shaped recess 110 of second side wall 106 of male portion 102 of associated joint of joinery 24
118 straight portion of second wall 114 of substantially wedge-shaped recess 110 of second side wall 106 of male portion 102 of each joint of joinery 24
119 angle of the female portion 100 of each joint of joinery 24
120 smooth convex portion of second wall 114 of substantially wedge-shaped recess 110 of second side wall 106 of male portion 102 of each joint of joinery 24 for eliminating high stress area thereat that would be present if area thereat was not smooth convex portion 120 of second wall 114 of substantially wedge-shaped recess 110 of second side wall 106 of male portion 102 of associated joint of joinery 24

DETAILED DESCRIPTION OF THE PREFERRED EMBODIMENT

Introductory

Figure 1:
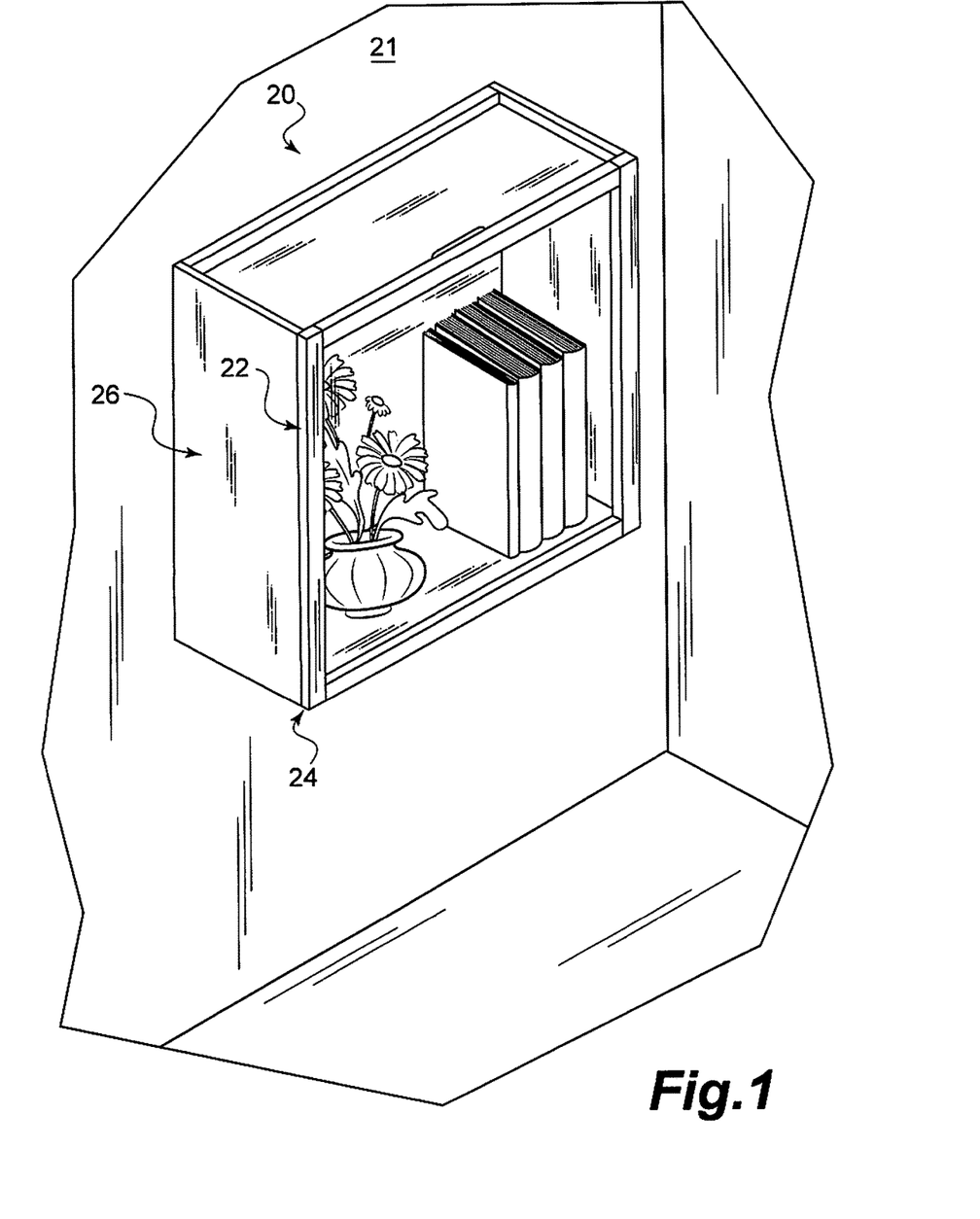
FIG. 1 is a diagrammatic perspective view of an embodiment of a cabinet assembly system utilizing cooperating grooved components in use.
Figure 2:
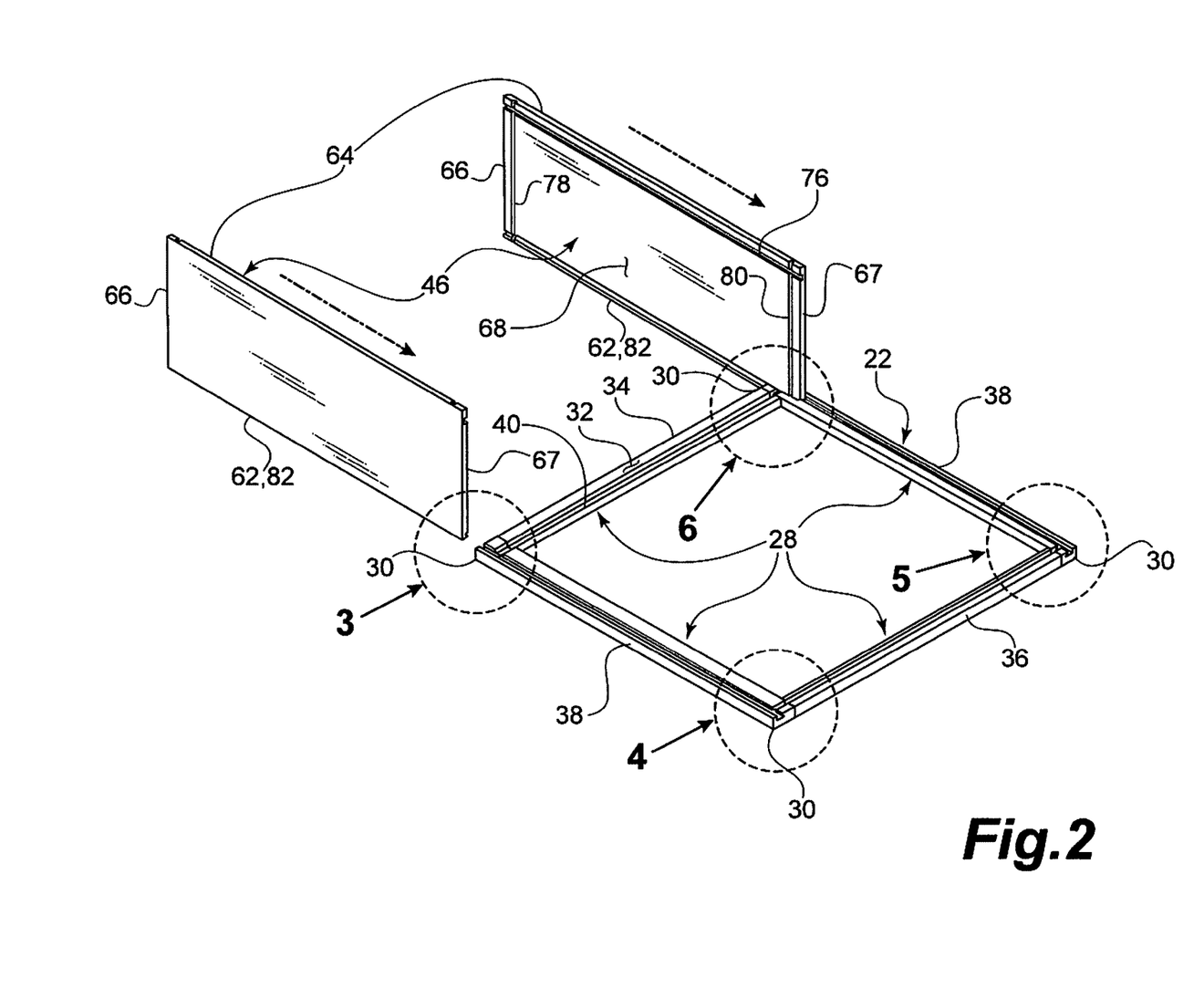
FIG. 2 is a diagrammatic perspective view of a frame component with two side walls being assembled therewith utilizing cooperating grooves.
Figure 3:
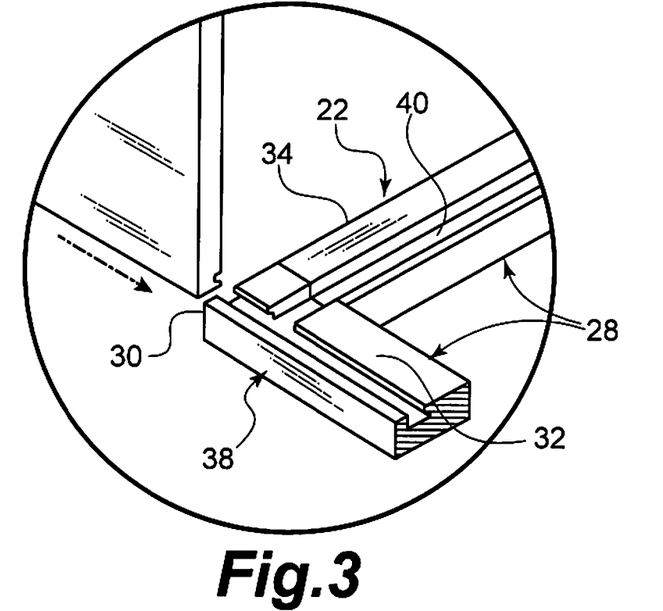
FIGS. 3, 4, 5 and 6 are enlarged diagrammatic perspective views showing the areas enclosed in the dotted circles respectively indicated by arrows 3, 4, 5, and 6 in FIG. 2 in greater detail.
Figure 4:
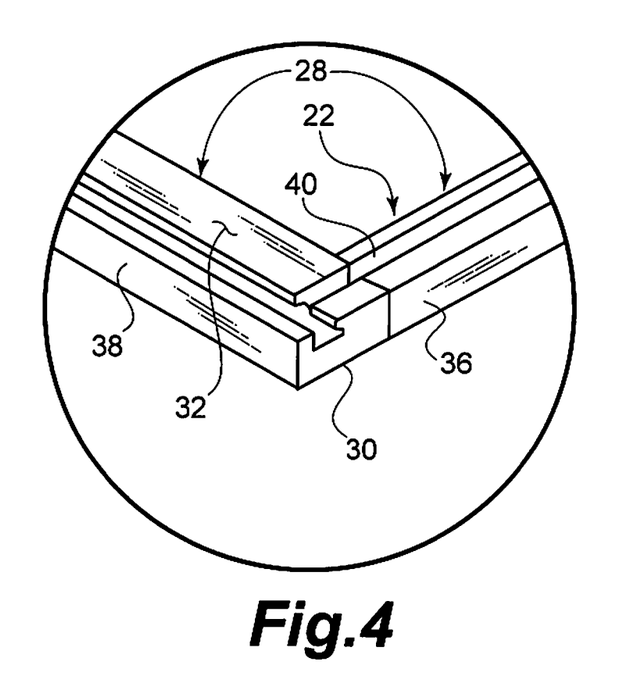
Figure 5:
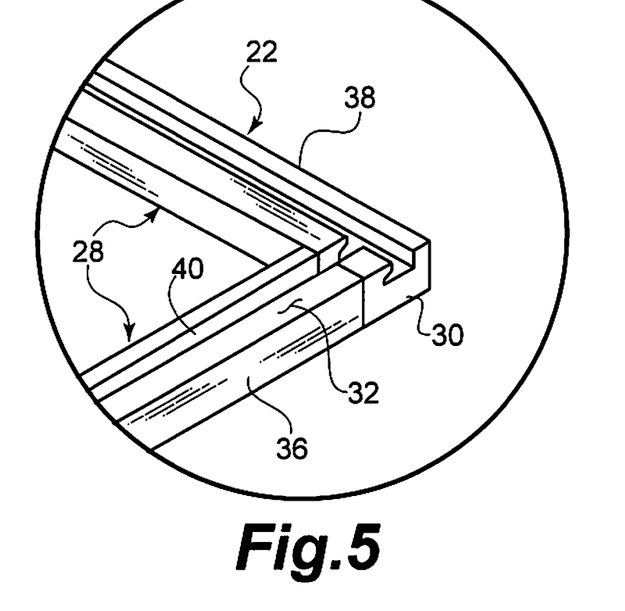
Figure 6:
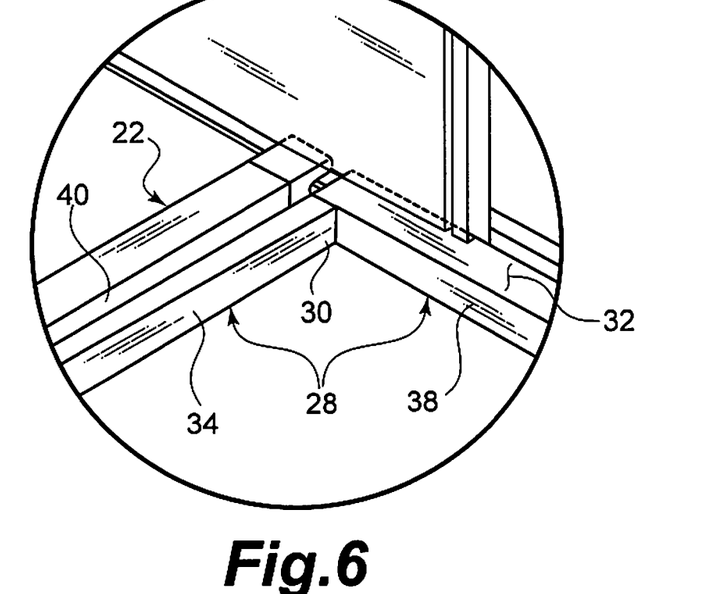
Figure 7:
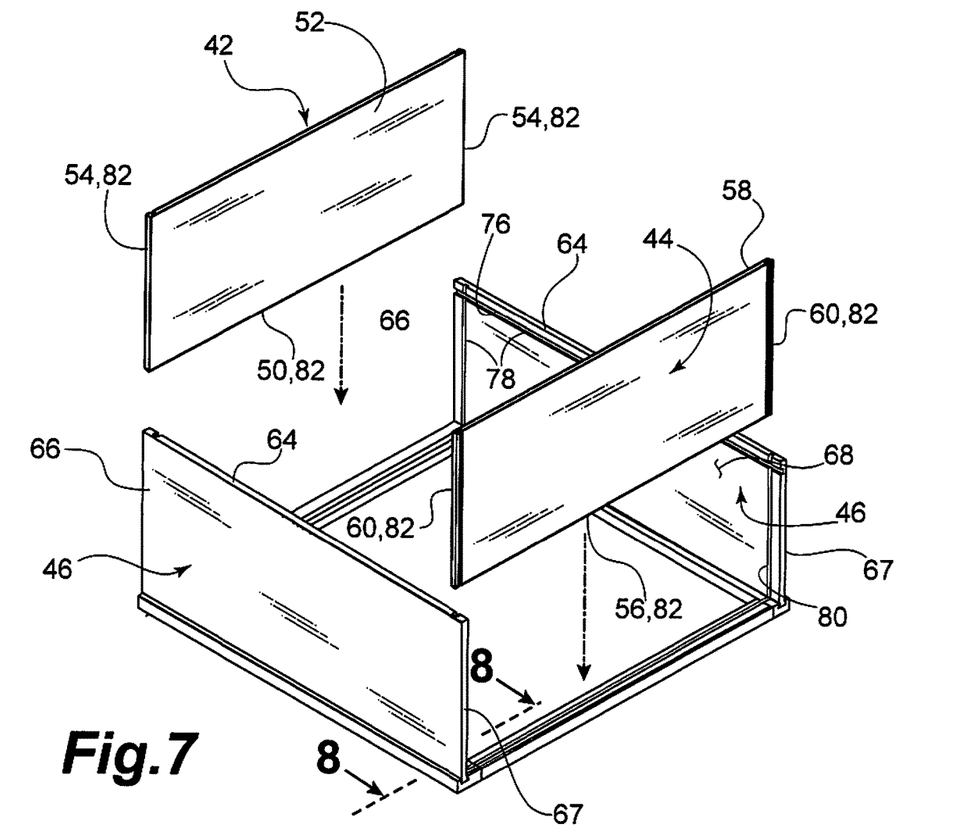
FIG. 7 is a diagrammatic perspective view of the assembled components shown in FIG. 2 having a top and bottom wall being further assembled therewith.
Figure 14:
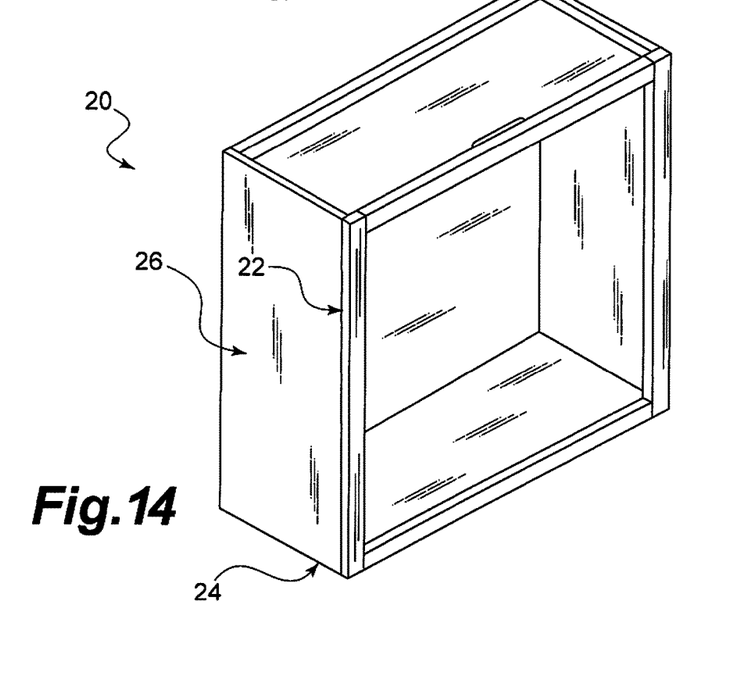
FIG. 14 is a diagrammatic perspective view of an embodiment of the completed cabinet assembly system utilizing cooperating grooved components per se.

Referring now to the figures of the drawing, in which like numerals indicate like parts, and particularly to FIGS. 1 and 14, the cabinet of the embodiments of the present invention is shown generally at 20 for hanging on a wall 21 and for directing forces in such a manner so as to provide a stronger assembly.

Overall Configuration of the Cabinet 20

The overall configuration of the cabinet 20 can best be seen in FIGS. 1 and 14, and as such, will be discussed with reference thereto.

The cabinet 20 includes a front frame 22, joinery 24, and a plurality of panels 26.

The joinery 24 attaches some of the plurality of panels 26 to each other and to the front frame 22, and is for directing the forces from the some of the plurality of panels 26 to the front frame 22 so as to provide the stronger assembly.

Specific Configuration of the Front Frame 22

The specific configuration of the front frame 22 can best be seen in FIGS. 2-6, and as such, will be discussed with reference thereto.

The front frame 22 includes a plurality of frame members 28.

The plurality of frame members 28 of the front frame 22 have rear surfaces 32, are slender, elongated, coplanar, are disposed in one of a rectangular parallelogram configuration having corners 30 and a square parallelogram configuration having corners 30.

The corners 30 of the one of the rectangular parallelogram configuration and the square parallelogram configuration are perpendicular and flush.

The plurality of frame members 28 of the front frame 22 include a top member 34, a bottom member 36, and a pair of side members 38.

The rear surfaces 32 of the plurality of frame members 28 of the front frame 22 have blind slots 40, respectively.

The blind slots 40 of the rear surfaces 32 of the plurality of frame members 28 of the front frame 22 extend longitudinally and completely therealong.

The blind slots 40 of the rear surfaces 32 of the plurality of frame members 28 of the front frame 22, respectively, communicate with each other at the corners 30 of the front frame 22.

Specific Configuration of the Plurality of Panels 26

The specific configuration of the plurality of panels 26 can best be seen in FIGS. 2, 7, 9, 10, 12, and 13.

The plurality of panels 26 are thin, rectangular-shaped, and include a top panel 42, a bottom panel 44, a pair of side panels 46, and a rear panel 48.

The top panel 42 of the plurality of panels 26 has a front edge 50, a rear edge 52, a pair of side edges 54, and a depth.

The bottom panel 44 of the plurality of panels 26 has a front edge 56, a rear edge 58, a pair of side edges 60, and a depth.

The pair of side panels 46 of the plurality of panels 26 have front edges 62, respectively, rear edges 64, respectively, top edges 66, respectively, bottom edges 67, respectively, inner surfaces 68, respectively, and depths, respectively.

The rear panel 48 of the plurality of panels 26 has a top edge 70, a bottom edge 72, and a pair of side edges 74.

The depth of each side panel 46 of the plurality of panels 26 is greater than the depth of each of the top panel 42 of the plurality of panels 26 and the bottom panel 44 of the plurality of panels 26.

Each side panel 46 of the plurality of panels 26 has a rear blind slot 76.

The rear blind slot 76 of each side panel 46 of the plurality of panels 26 is disposed parallel to, and in close proximity to, the rear edge 64 of an associated side panel 46 of the plurality of panels 26, and extends along the inner surface of 68 of the associated side panel 46 of the plurality of panels 26, from the top edge 66 of the associated side panel 46 of the plurality of panels 26 to the bottom edge 67 of the associated side panel 46 of the plurality of panels 26.

Each side panel 46 of the plurality of panels 26 further has a top blind slot 78.

The top blind slot 78 of each side panel 46 of the plurality of panels 26 is disposed parallel to, and in close proximity to, the top edge 66 of an associated side panel 46 of the plurality of panels 26, and extends along the inner surface 68 of the associated side panel 46 of the plurality of panels 26, from the rear edge 64 of the associated side panel 46 of the plurality of panels 26 to front edge 68 of the associated side panel 46 of the plurality of panels 26.

Each side panel 46 of the plurality of panels 26 further has a bottom blind slot 80.

The bottom blind slot 80 of each side panel 46 of the plurality of panels 26 is disposed parallel to, and in close proximity to, the bottom edge 67 of an associated side panel 46 of the plurality of panels 26, and extends along the inner surface 68 of the associated side panel 46 of the plurality of panels 26, from the rear edge 64 of the associated side panel 46 of the plurality of panels 26 to the front edge 68 of the associated side panel 46 of the plurality of panels 26.

The rear blind slot 76 of each side panel 46 of the plurality of panels 26 communicates with the top blind slot 78 of an associated side panel 46 of the plurality of panels 26 and with the bottom blind slot 80 of the associated side panel 46 of the plurality of panels 26.

The plurality of panels 26 further include glue 82.

The front edges 62 of the pair of side panels 46 of the plurality of panels 26 are slidingly received in the blind slots 40 of the rear surfaces 32 of the pair of side members 38 of the plurality of frame members 28 of the front frame 22, respectively, by the joinery 24, with the pair of side panels 46 of the plurality of panels 26 extending perpendicularly rearwardly therefrom, and which are maintained thereat by the glue 82 of the plurality of panels 26.

The pair of side edges 54 of the top panel 42 of the plurality of panels 26 are slidingly received in the top blind slots 78 of the pair of side panels 46 of the plurality of panels 26, respectively, by the joinery 24, and the front edge 50 of the top panel 42 of the plurality of panels 26 is slidingly received in the blind slot 40 of the rear surface 32 of the top member 34 of the plurality of frame members 28 of the front frame 22, and which are maintained thereat by the glue 82 of the plurality of panels 26.

The pair of side edges 60 of the bottom panel 44 of the plurality of panels 26 are slidingly received in the bottom blind slots 80 of the pair of side panels 46 of the plurality of panels 26, respectively, by the joinery 24, and the front edge 56 of the bottom panel 44 of the plurality of panels 26 is slidingly received in the blind slot 40 of the rear surface 32 of the bottom member 36 of the plurality of frame members 28 of the front frame 22, and which are maintained thereat by the glue 82 of the plurality of panels 26.

The side edges 74 of the rear panel 48 of the plurality of panels 26 are slidingly received in the rear blind slots 76 of the pair of side panels 46 of the plurality of panels 26, respectively, and are maintained thereat by the glue 82, with the top edge 70 of the rear panel 48 of the plurality of panels 26 resting on the rear edge 52 of the top panel 42 of the plurality of panels 26, and being maintained thereat by the glue 82, and with the bottom edge 72 of the rear panel 48 of the plurality of panels 26 resting on the rear edge 58 of the bottom panel 44 of the plurality of panels 26, and being maintained thereat by the glue 82.

Figure 10:
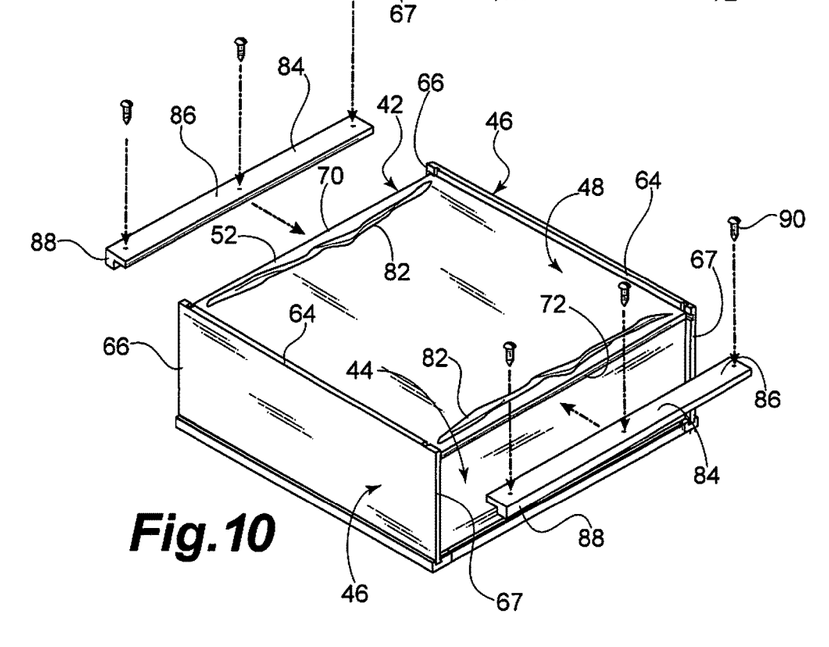
FIG. 10 shows two reinforcing components having L-shaped cross sections being secured to the assembly of FIG. 9.
Figure 11:
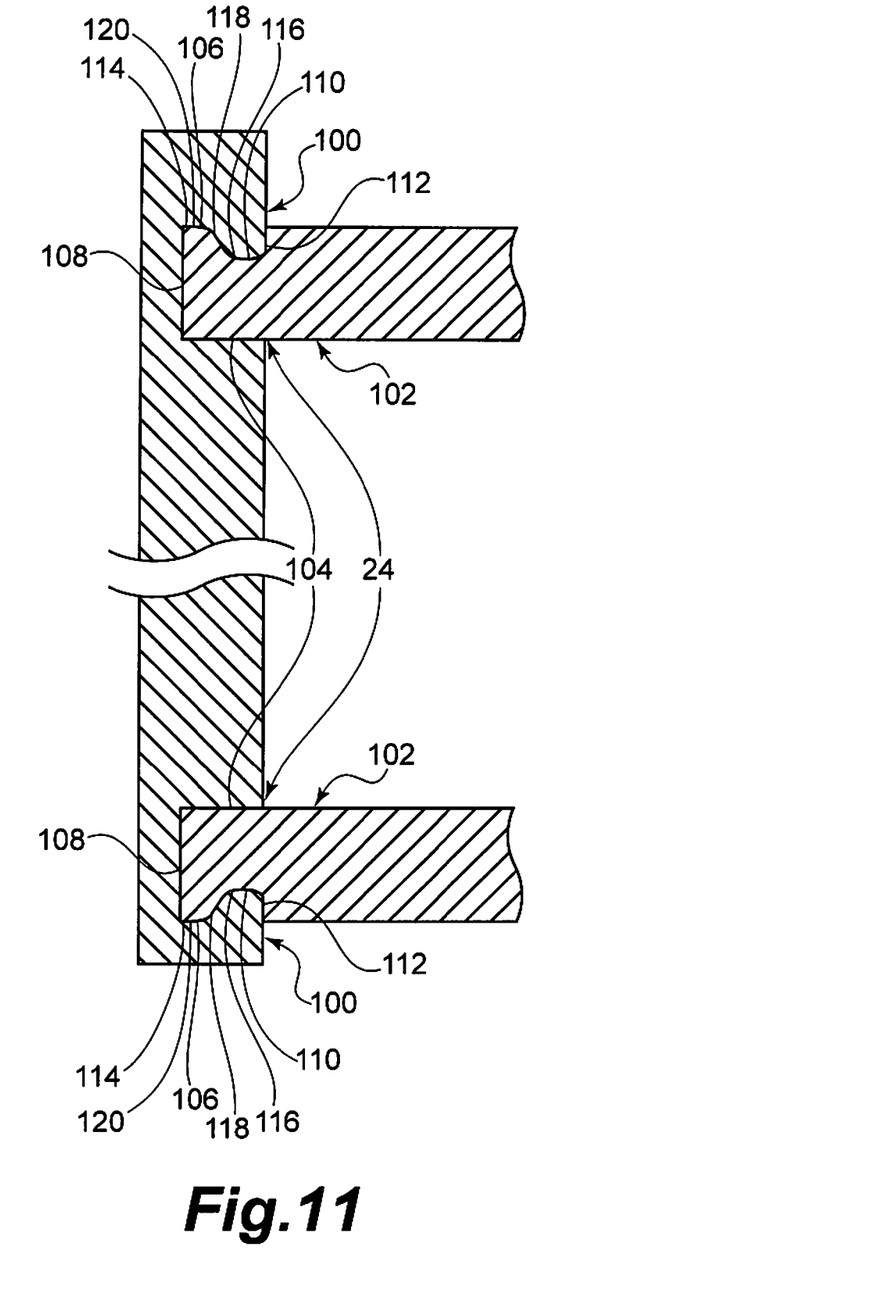
FIG. 11 is a cross sectional view, with parts broken away, taken on line 11-11 of FIG. 9.

The plurality of panels 26 further include a pair of hanging ledgers/cleats 84. The pair of hanging ledgers/cleats 84 of the plurality of panels 26 are for hanging the cabinet 20 onto the wall 21.

The pair of hanging ledgers/cleats 84 of the plurality of panels 26 are slender, elongated, and right angled in lateral cross section so as to provide rear portions 86 and top/bottom portions 88, and include screws 90.

A top hanging ledger/cleat of the pair of hanging ledgers/cleats 84 of the plurality of panels 26 is disposed along where the top edge 70 of the rear panel 48 of the plurality of panels 26 meets the rear edge 52 of the top panel 42 of the plurality of panels 26.

The rear portion 86 of the top hanging ledger/cleat of the pair of hanging ledgers/cleats 84 of the plurality of panels 26 extends along the rear panel 48 of the plurality of panels 26, and is maintained thereat by the glue 82 of the plurality of panels 26 and by the screws 90 of the plurality of panels 26.

The top portion 88 of the top hanging ledger/cleat 84 of the pair of hanging ledgers/cleats 84 of the plurality of panels 26 extends along the top panel 42 of the plurality of panels 26.

A bottom hanging ledger/cleat of the pair of hanging ledgers/cleats 84 of the plurality of panels 26 is disposed along where the bottom edge 72 of the rear panel 48 of the plurality of panels 26 meets the rear edge 58 of the bottom panel 44 of the plurality of panels 26.

The rear portion 86 of the bottom hanging ledger/cleat of the pair of hanging ledgers/cleats 84 of the plurality of panels 26 extends along the rear panel 48 of the plurality of panels 26, and is maintained thereat by the glue 82 of the plurality of panels 26 and by the screws 90 of the plurality of panels 26.

The bottom portion 88 of the bottom hanging ledger/cleat 84 of the pair of hanging ledgers/cleats 84 of the plurality of panels 26 extends along the bottom panel 44 of the plurality of panels 26.

Figures 12, 13:
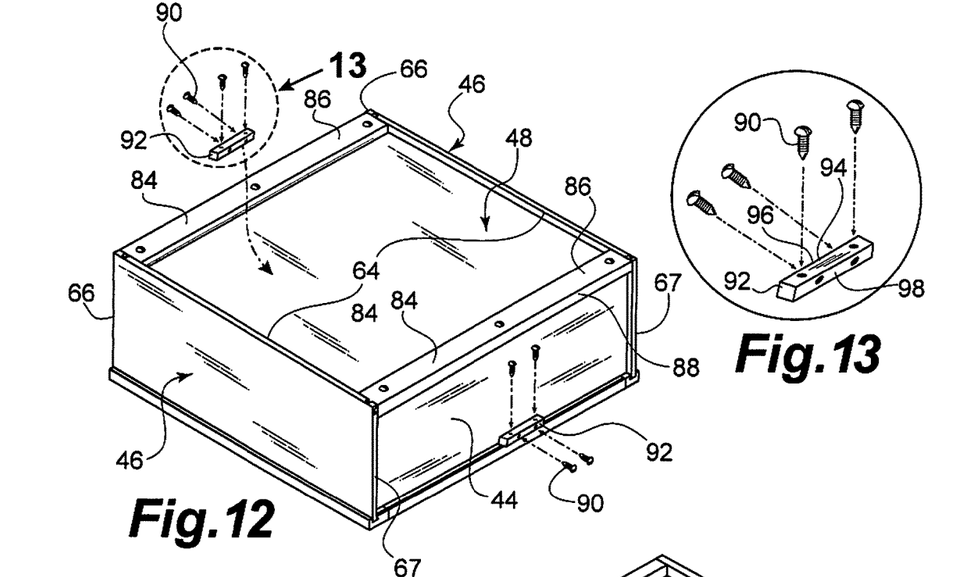
FIG. 12 shows two reinforcing blocks being secured adjacent to an upper and lower front edges of the cabinet assembly.
FIG. 13 is an enlarged perspective view of a reinforcing block assemblage per se.

The plurality of panels 26 further include a pair of reinforcing blocks 92. The pair of reinforcing blocks 92 of the plurality of panels 26 are for reinforcing the cabinet 20 when the cabinet 20 is at least 30" wide.

The pair of reinforcing blocks 92 of the plurality of panels 26 are rectangular-parallelepiped-shaped, and as such, have rear faces 94, respectively, top faces 96, respectively, and bottom faces 98, respectively.

A top reinforcing blocks 92 of the plurality of panels 26 is disposed along where the front edge 50 of the top panel 42 of the plurality of panels 26 meets the top member 34 of the plurality of frame members 28 of the front frame 22, and is maintained thereat by two pair of the screws 90.

One pair of the screws 90 of the plurality of panels 26 extend through the rear face 94 of the top reinforcing block 92 of the plurality of panels 26 and into the top member 34 of the plurality of frame members 28 of the front frame 22.

The other pair of the screws 90 of the plurality of panels 26 extend through the top face 96 of the top reinforcing block 92 of the plurality of panels 26 and into the top panel 42 of the plurality of panels 26.

The one pair of the screws 90 of the top reinforcing block 92 of the plurality of panels 26 are perpendicular to the other pair of the screws 90 of the top reinforcing block 92 of the plurality of panels 26 so as to provide orthogonal support.

The one pair of the screws 90 of the top reinforcing block 92 of the plurality of panels 26 are offset from the other pair of the screws 90 of the top reinforcing block 92 of the plurality of panels 26 so as not to interfere with each other.

A bottom reinforcing block 92 of the plurality of panels 26 is disposed along where the front edge 50 of the bottom panel 44 of the plurality of panels 26 meets the bottom member 36 of the plurality of frame members 28 of the front frame 22, and is maintained thereat by two pair of the screws 90.

One pair of the screws 90 of the bottom reinforcing block 92 of the plurality of panels 26 extend through the rear face 94 of the bottom reinforcing block 92 of the plurality of panels 26 and into the bottom member 36 of the plurality of frame members 28 of the front frame 22.

The other pair of the screws 90 of the bottom reinforcing block 92 of the plurality of panels 26 extend through the bottom face 98 of the bottom reinforcing block 92 of the plurality of panels 26 and into the bottom panel 44 of the plurality of panels 26.

The one pair of the screws 90 of the bottom reinforcing block 92 of the plurality of panels 26 are perpendicular to the other pair of the screws 90 of the bottom reinforcing block 92 of the plurality of panels 26 so as to provide orthogonal support.

The one pair of the screws 90 of the bottom reinforcing block 92 of the plurality of panels 26 are offset from the other pair of the screws 90 of the bottom reinforcing block 92 of the plurality of panels 26 so as not to interfere with each other.

Specific Configuration of the Joinery 24

The specific configuration of the joinery 24 can best be seen in FIGS. 8, 8A, 8B, and 11, and as such, will be discussed with reference thereto.

Each joint of the joinery 24 has a female portion 100 and a male portion 102.

The blind slots 40 of the rear surfaces 32 of the side members 38 of the plurality of frame members 28 of the front frame 22, respectively, are the female portions 100 of the joinery 24.

The top blind slots 78 of the pair of side panels 46 of the plurality of panels 26, respectively, are the female portions 100 of the joinery 24.

The bottom blind slots 80 of the pair of side panels 46 of the plurality of panels 26, respectively, are the female portions 100 of the joinery 24.

The front edges 62 of the pair of side panels 46 of the plurality of panels 26, respectively, are the male portions 102 of the joinery 24.

The pair of side edges 54 of the top panel 42 of the plurality of panels 26 are the male portions 102 of the joinery 24.

The pair of side edges 60 of the bottom panel 44 of the plurality of panels 26 are the male portions 102 of the joinery 24.

The male portion 102 of each joint of the joinery 24 is defined by a first side wall 104, a second side wall 106, and a bottom wall 108.

The first side wall 104 of the male portion 102 of each joint of the joinery 24 is straight.

The bottom wall 108 of the male portion 102 of each joint of the joinery 24 is straight and perpendicular to the first side wall 104 of the male portion 102 of an associated joint of the joinery 24.

The second side wall 106 of the male portion 102 of each joint of the joinery 24 contains a substantially wedge-shaped recess 110.

The substantially wedge-shaped recess 110 of the second side wall 106 of the male portion 102 of each joint of the joinery 24 is defined by a first wall 112 and a second wall 114.

The first wall 112 of the substantially wedge-shaped recess 110 of the second side wall 106 of the male portion 102 of each joint of the joinery 24 is perpendicular to the first side wall 104 of the male portion 102 of an associated joint of the joinery 24.

Figure 8:
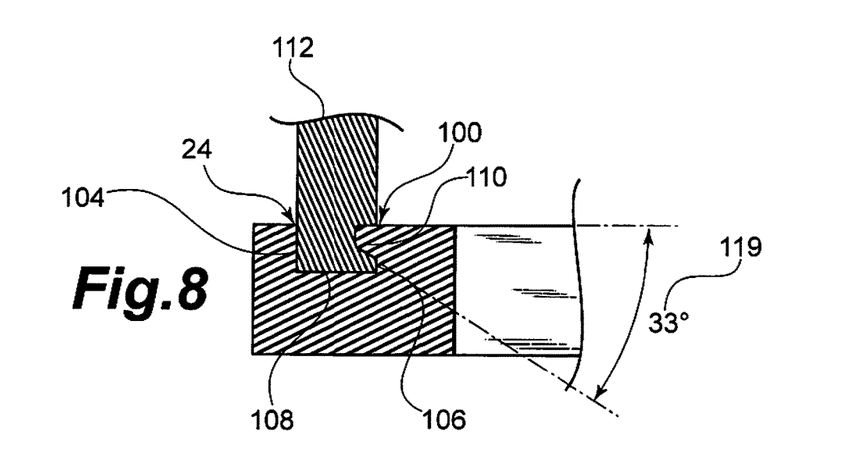
FIG. 8 is a cross sectional view, with parts broken away, taken on line 8-8 in FIG. 7, showing a tongue and groove securement mechanism having an optimal angle of 33 degrees.

The second wall 114 of the substantially wedge-shaped recess 110 of the second side wall 106 of the male portion 102 of each joint of the joinery 24 extends from the first wall 112 of the substantially wedge-shaped recess 110 of the second side wall 106 of the male portion 102 of an associated joint of the joinery 24, first as a smooth concave portion 116 for eliminating a high stress area thereat that would be present if the area thereat was not the smooth concave portion 116 of the second wall 114 of the substantially wedge-shaped recess 110 of the second side wall 106 of the male portion 102 of the associated joint of the joinery 24, then as a straight portion 118 that is, as shown in FIG. 8, at an angle 119 of 33° with the first wall 112 of the substantially wedge-shaped recess 110 of the second side wall 106 of the male portion 102 of the associated joint of the joinery 24, and then extends to the bottom wall 108 of the male portion 102 of the associated joint of the joinery 24 as a smooth convex portion 120 for eliminating a high stress area thereat that would be present if the area thereat was not the smooth convex portion 120 of the second wall 114 of the substantially wedge-shaped recess 110 of the second side wall 106 of the male portion 102 of the associated joint of the joinery 24. It is understood that while the drawing figure shows an angle of 33°, which is the preferred construction, empirical testing has shown an angle between 28° and 38° to be suitable to strong construction without male or female failure.

The female portion 100 of a joint of the joinery 24 is a complement of the male portion 102 of the joint of the joinery 24 so as to allow the male portion 102 of the joint of the joinery 24 to slide freely, but securely, in the female portion 100 of the joint of the joinery 24.

Figure 8A:
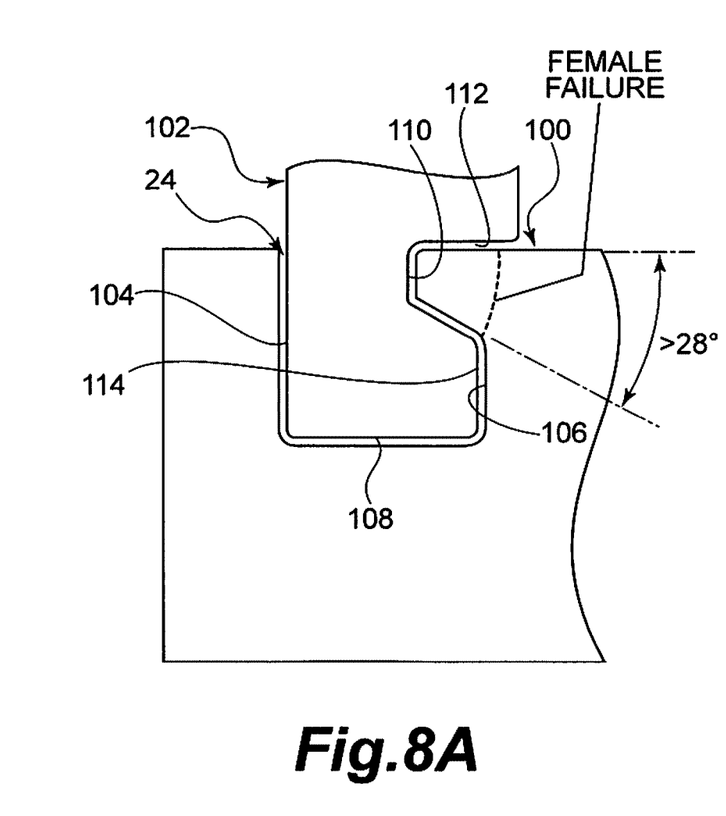
FIG. 8A is a cross sectional view, with cross hatching omitted for clarity and parts broken away, showing a tongue and groove securement mechanism having an angle of less than 28 degrees thereby yielding female component failure.
Figure 8B:
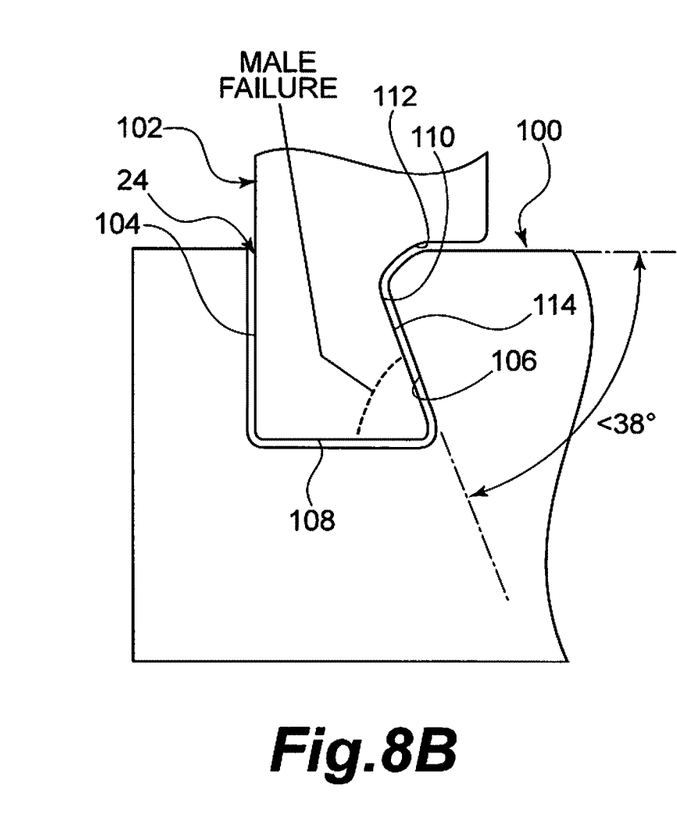
FIG. 8B is a cross sectional view, with cross hatching omitted for clarity and parts broken away, showing a tongue and groove securement mechanism having an angle of greater than 38 degrees thereby yielding male component failure.
Figure 9:
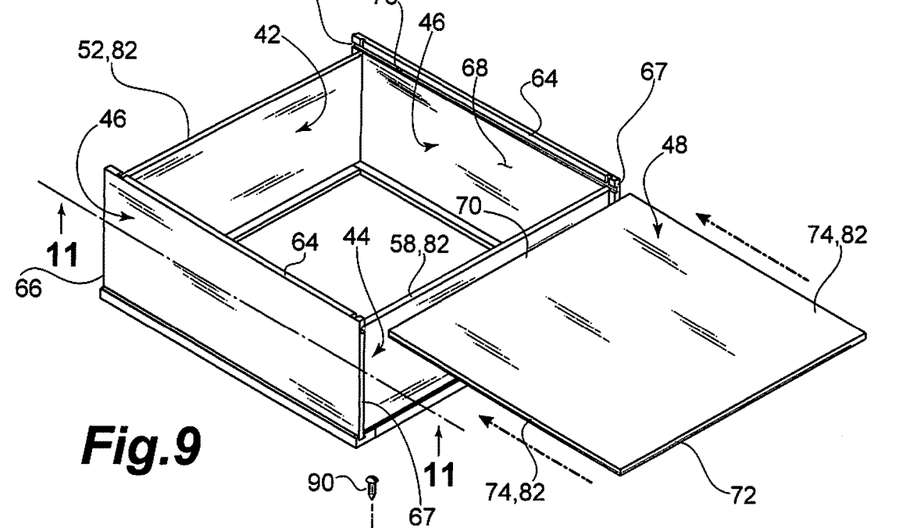
FIG. 9 shows the assembly of FIG. 8 having a rear wall being assembled therewith.

It has been proven empirically that, as shown in FIG. 8A, if the angle 119 of the female portion 100 is less than 28°, then the female portion 100 of the joinery 24 would be prone to failure, however, as shown in FIG. 8B, if the angle 119 of the female portion 100 is greater than 38°, then the male portion 102 of the joinery 24 would be prone to failure. Thus, showing the criticality of the angle 119 of the female portion 100 being 28-38° shows that the angle 119 being 28-38° is not a design choice.

Even though Applicant Vaughan may not know why the angle 119 of the female portion 100 being 28-38° is optimum, Applicant Vaughan respectfully submits that, as was decided in *In re Bowden and Iddings,* 86 USPQ 419, 423 (CCPA 1950), Applicant Vaughan must disclose only the structure and that Applicant Vaughan need not disclose, or even understand, the theory explaining why the angle 119 of the female portion 100 being 28-38° is optimum:

"Under the law a patent will be issued to an inventor although he may not understand the principle upon which his invention works. *In re Parlanti* et al., 34 CCPA (Patents) 803, 158 F.2d 1018, 72 USPQ 275." [Emphasis added]

In this same regard, attention is respectfully directed to the decisions in Diamond Rubber Co. v. Consolidated Rubber Tire Co., 220 U.S. 428, 55 L.Ed. 527, 31 S.Ct. 444 (1911); and Cf. DeForest Radio co. v. General Elec. Co., 283 U.S. 664, 668, 75 L.Ed. 1339, 51 S.Ct. 563, 7 USPQ 67 (1931).

Impressions

It will be understood that each of the elements described above, or two or more together, may also find a useful application in other types of constructions differing from the types described above.

While the invention has been illustrated and described as embodiments of a cabinet and joinery for assembling a portion of the cabinet, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A cabinet for hanging on a wall and for directing forces in such a manner so as to provide a stronger assembly, comprising:
   a) a front frame;
   b) joinery; and
   c) a plurality of panels;
   wherein said joinery attaches some of said plurality of panels to each other;
   wherein said joinery attaches some of said plurality of panels to said front frame; and
   wherein said joinery is for directing the forces from said some of said plurality of panels to said front frame so as to provide the stronger assembly;
   wherein said front frame includes a plurality of frame members;
   wherein said plurality of frame members of said front frame are slender;
   wherein said plurality of frame members of said front frame are elongated;
   wherein said plurality of frame members of said front frame are coplanar;
   wherein said plurality of frame members of said front frame are disposed in a parallelogram configuration;
   wherein said plurality of frame members of said front frame are disposed in one of a rectangular parallelogram configuration and a square parallelogram configuration;
   wherein said front frame has corners;
   wherein said corners of said front frame are perpendicular;
   wherein said corners of said front frame are flush;
   wherein said plurality of frame members of said front frame have rear surfaces;
   wherein said plurality of frame members of said front frame include a top member;
   wherein said plurality of frame members of said front frame include a bottom member;
   wherein said plurality of frame members of said front frame include a pair of side members;
   wherein said rear surfaces of said plurality of frame members of said front frame have blind slots, respectively;
   wherein said rear surfaces of said plurality of frame members of said front frame have said blind slots, respectively, extending longitudinally therealong;
   wherein said rear surfaces of said plurality of frame members of said front frame have said blind slots, respectively, extending completely therealong;
   wherein said blind slots of said rear surfaces of said plurality of frame members of said front frame, respectively, communicate with each other.

2. The cabinet of claim 1, wherein said blind slots of said rear surfaces of said plurality of frame members of said front frame, respectively, communicate with each other at said corners of said front frame.

3. The cabinet of claim 2, wherein said plurality of panels are thin.

4. The cabinet of claim 3, wherein said plurality of panels are rectangular-shaped.

5. The cabinet of claim 4, wherein said plurality of panels include a top panel.

6. The cabinet of claim 5, wherein said plurality of panels include a bottom panel.

7. The cabinet of claim 6, wherein said plurality of panels include a pair of side panels.

8. The cabinet of claim 7, wherein said plurality of panels include a rear panel.

9. The cabinet of claim 8, wherein said top panel of said plurality of panels has a front edge.

10. The cabinet of claim 9, wherein said top panel of said plurality of panels has a rear edge.

11. The cabinet of claim 10, wherein said top panel of said plurality of panels has a pair of side edges.

12. The cabinet of claim 11, wherein said top panel of said plurality of panels has a depth.

13. The cabinet of claim 12, wherein said bottom panel of said plurality of panels has a front edge.

14. The cabinet of claim 13, wherein said bottom panel of said plurality of panels has a rear edge.

15. The cabinet of claim 14, wherein said bottom panel of said plurality of panels has a pair of side edges.

16. The cabinet of claim 15, wherein said bottom panel of said plurality of panels has a depth.

17. The cabinet of claim 16, wherein said pair of side panels of said plurality of panels have front edges, respectively.

18. The cabinet of claim 17, wherein said pair of side panels of said plurality of panels have rear edges, respectively.

19. The cabinet of claim 18, wherein said pair of side panels of said plurality of panels have top edges, respectively.

20. The cabinet of claim 19, wherein said pair of side panels of said plurality of panels have bottom edges, respectively.

21. The cabinet of claim 20, wherein said pair of side panels of said plurality of panels have inner surfaces, respectively.

22. The cabinet of claim 21, wherein said pair of side panels of said plurality of panels have depths, respectively.

23. The cabinet of claim 22, wherein said rear panel of said plurality of panels has a top edge.

24. The cabinet of claim 23, wherein said rear panel of said plurality of panels has a bottom edge.

25. The cabinet of claim 24, wherein said rear panel of said plurality of panels has a pair of side edges.

26. The cabinet of claim 25, wherein said depth of each side panel of said plurality of panels is greater than said depth of said top panel of said plurality of panels.

27. The cabinet of claim 26, wherein said depth of each side panel of said plurality of panels is greater than said depth of said bottom panel of said plurality of panels.

28. The cabinet of claim 27, wherein each side panel of said plurality of panels has a rear blind slot.

29. The cabinet of claim 28, wherein said rear blind slot of each side panel of said plurality of panels is disposed parallel to said rear edge of an associated side panel of said plurality of panels.

30. The cabinet of claim 29, wherein said rear blind slot of each side panel of said plurality of panels is disposed in close proximity to said rear edge of an associated side panel of said plurality of panels.

31. The cabinet of claim 30, wherein said rear blind slot of each side panel of said plurality of panels extends along said inner surface of an associated side panel of said plurality of panels.

32. The cabinet of claim 31, wherein said rear blind slot of each side panel of said plurality of panels extends from said top edge of an associated side panel of said plurality of panels to said bottom edge of said associated side panel of said plurality of panels.

33. The cabinet of claim 32, wherein each side panel of said plurality of panels has a top blind slot.

34. The cabinet of claim 33, wherein said top blind slot of each side panel of said plurality of panels is disposed parallel to said top edge of an associated side panel of said plurality of panels.

35. The cabinet of claim 34, wherein said top blind slot of each side panel of said plurality of panels is disposed in close proximity to said top edge of an associated side panel of said plurality of panels.

36. The cabinet of claim 35, wherein said top blind slot of each side panel of said plurality of panels extends along said inner surface of an associated side panel of said plurality of panels.

37. The cabinet of claim 36, wherein said top blind slot of each side panel of said plurality of panels extends from said rear edge of an associated side panel of said plurality of panels to said front edge of said associated side panel of said plurality of panels.

38. The cabinet of claim 37, wherein each side panel of said plurality of panels has a bottom blind slot.

39. The cabinet of claim 38, wherein said bottom blind slot of each side panel of said plurality of panels is disposed parallel to said bottom edge of an associated side panel of said plurality of panels.

40. The cabinet of claim 39, wherein said bottom blind slot of each side panel of said plurality of panels is disposed in close proximity to said bottom edge of an associated side panel of said plurality of panels.

41. The cabinet of claim 40, wherein said bottom blind slot of each side panel of said plurality of panels extends along said inner surface of an associated side panel of said plurality of panels.

42. The cabinet of claim 41, wherein said bottom blind slot of each side panel of said plurality of panels extends from said rear edge of an associated side panel of said plurality of panels to said front edge of said associated side panel of said plurality of panels.

43. The cabinet of claim 42, wherein said rear blind slot of each side panel of said plurality of panels communicates with said top blind slot of an associated side panel of said plurality of panels.

44. The cabinet of claim 43, wherein said rear blind slot of each side panel of said plurality of panels communicates with said bottom blind slot of an associated side panel of said plurality of panels.

45. The cabinet of claim 44, wherein said plurality of panels include glue.

46. The cabinet of claim 45, wherein said front edges of said pair of side panels of said plurality of panels are slidingly received in said blind slots of said rear surfaces of said pair of side members of said plurality of frame members of said front frame, respectively, by said joinery.

47. The cabinet of claim 46, wherein said pair of side panels of said plurality of panels extend perpendicularly rearwardly from said pair of side members of said plurality of frame members of said front frame, respectively.

48. The cabinet of claim 47, wherein said front edges of said pair of side panels of said plurality of panels are maintained slidingly received in said blind slots of said rear surfaces of said pair of side members of said plurality of frame members of said front frame, respectively, by said glue of said plurality of panels.

49. The cabinet of claim 48, wherein said pair of side edges of said top panel of said plurality of panels are slidingly received in said top blind slots of said pair of side panels of said plurality of panels, respectively, by said joinery.

50. The cabinet of claim 49, wherein said pair or side edges of said top panel of said plurality of panels are maintained slidingly received in said top blind slots of said pair of side panels of said plurality of panels, respectively, by said glue of said plurality of panels.

51. The cabinet of claim 50, wherein said front edge of said top panel of said plurality of panels is slidingly received in said blind slot of said rear edge of said top member of said plurality of frame members of said front frame.

52. The cabinet of claim 51, wherein said front edge of said top panel of said plurality of panels is slidingly received in said blind slot of said rear edge of said top member of said plurality of frame members of said front frame by said glue of said plurality of panels.

53. The cabinet of claim 52, wherein said pair of side edges of said bottom panel of said plurality of panels are slidingly received in said bottom blind slots of said pair of side panels of said plurality of panels, respectively, by said joinery.

54. The cabinet of claim 53, wherein said pair of side edges of said bottom panel of said plurality of panels are maintained slidingly received in said bottom blind slots of said pair of side panels of said plurality of panels, respectively, by said glue of said plurality of panels.

55. The cabinet of claim 54, wherein said front edge of said bottom panel of said plurality of panels is slidingly received in said blind slot of said rear surface of said bottom member of said plurality of frame members of said front frame.

56. The cabinet of claim 55, wherein said front edge of said bottom panel of said plurality of panels is maintained slidingly received in said blind slot of said rear surface of said bottom member of said plurality of frame members of said front frame by said glue of said plurality of panels.

57. The cabinet of claim 56, wherein said side edges of said rear panel of said plurality of panels is slidingly received in said rear blind slots of said pair of side panels of said plurality of panels, respectively.

58. The cabinet of claim 57, wherein said side edges of said rear panel of said plurality of panels are maintained slidingly received in said top blind slots of said pair of side panels of said plurality of panels, respectively, by said glue of said plurality of panels.

59. The cabinet of claim 58, wherein said top edge of said rear panel of said plurality of panels rests on said rear edge of said top panel of said plurality of panels.

60. The cabinet of claim 59, wherein said top edge of said rear panel of said plurality of panels is maintained resting on said rear edge of said top panel of said plurality of panels by said glue of said plurality of panels.

61. The cabinet of claim 60, wherein said bottom edge of said rear panel of said plurality of panels rests on said rear edge of said bottom panel of said plurality of panels.

62. The cabinet of claim 61, wherein said bottom edge of said rear panel of said plurality of panels is maintained resting on said rear edge of said bottom panel of said plurality of panels by said glue of said plurality of panels.

63. The cabinet of claim 62, wherein said plurality of panels include a pair of hanging ledgers/cleats; and
   wherein said pair of hanging ledgers/cleats of said plurality of panels are for hanging said cabinet on the wall.

64. The cabinet of claim 63, wherein said pair of hanging ledgers/cleats of said plurality of panels are slender.

65. The cabinet of claim 64, wherein said pair of hanging ledgers/cleats of said plurality of panels are elongated.

66. The cabinet of claim 65, wherein said pair of hanging ledgers/cleats of said plurality of panels are right angled in lateral cross section.

67. The cabinet of claim 66, wherein said pair of hanging ledgers/cleats of said plurality of panels have rear portions, respectively.

68. The cabinet of claim 67, wherein said pair of hanging ledgers/cleats of said plurality of panels have top/bottom portions, respectively.

69. The cabinet of claim 68, wherein said plurality of panels include screws.

70. The cabinet of claim 69, wherein a top hanging ledger/cleat of said pair of hanging ledgers/cleats of said plurality of panels is disposed along where said top edge of said rear panel of said plurality of panels meets said rear edge of said top panel of said plurality of panels.

71. The cabinet of claim 70, wherein said rear portion of said top hanging ledger/cleat of said pair of hanging ledgers/cleats of said plurality of panels extends along said rear panel of said plurality of panels.

72. The cabinet of claim 71, wherein said rear portion of said top hanging ledger/cleat of said pair of hanging ledgers/cleats of said plurality of panels is maintained extending along said rear panel of said plurality of panels by said glue of said plurality of panels.

73. The cabinet of claim 72, wherein said rear portion of said top hanging ledger/cleat of said pair of hanging ledgers/cleats of said plurality of panels is maintained extending along said rear panel of said plurality of panels by said screws of said plurality of panels.

74. The cabinet of claim 73, wherein said top portion of said top hanging ledger/cleat of said pair of hanging ledgers/cleats of said plurality of panels extends along said top panel of said plurality of panels.

75. The cabinet of claim 74, wherein a bottom hanging ledger/cleat of said pair of hanging ledgers/cleats of said plurality of panels is disposed along where said bottom edge of said rear panel of said plurality of panels meets said rear edge of said bottom panel of said plurality of panels.

76. The cabinet of claim 75, wherein said rear portion of said bottom hanging ledger/cleat of said pair of hanging ledgers/cleats of said plurality of panels extends along said rear panel of said plurality of panels.

77. The cabinet of claim 76, wherein said rear portion of said bottom hanging ledger/cleat of said pair of hanging ledgers/cleats of said plurality of panels is maintained extending along said rear panel of said plurality of panels by said glue of said plurality of panels.

78. The cabinet of claim 77, wherein said rear portion of said bottom hanging ledger/cleat of said pair of hanging ledgers/cleats of said plurality of panels is maintained extending along said rear panel of said plurality of panels by said screws of said plurality of panels.

79. The cabinet of claim 78, wherein said bottom portion of said bottom hanging ledger/cleat of said pair of hanging ledgers/cleats of said plurality of panels extends along said bottom panel of said plurality of panels.

80. The cabinet of claim 79, wherein said plurality of panels include a pair of reinforcing blocks; and
   wherein said pair of reinforcing blocks of said plurality of panels are for reinforcing said cabinet when said cabinet is at least 30" wide.

81. The cabinet of claim 80, wherein said pair of reinforcing blocks of said plurality of panels are rectangular-parallelepiped-shaped, respectively.

82. The cabinet of claim 81, wherein said pair of reinforcing blocks of said plurality of panels have rear faces, respectively.

83. The cabinet of claim 82, wherein said pair of reinforcing blocks of said plurality of panels have top faces, respectively.

84. The cabinet of claim 83, wherein said pair of reinforcing blocks of said plurality of panels have bottom faces, respectively.

85. The cabinet of claim 84, wherein a top reinforcing block of said plurality of panels is disposed along where said front edge of said top panel of said plurality of panels meets said top member of said plurality of frame members of said front frame.

86. The cabinet of claim 85, wherein a top reinforcing block of said plurality of panels is maintained along where said front edge of said top panel of said plurality of panels meets said top member of said plurality of frame members of said front frame by two pair of said screws.

87. The cabinet of claim 86, wherein one pair of said screws of said plurality of panels extend through said rear face of said top reinforcing block of said plurality of panels and into said top member of said plurality of frame members of said front frame.

88. The cabinet of claim 87, wherein the other pair of said screws of said plurality of panels extend through said top face of said top reinforcing block of said plurality of panels and into said top panel of said plurality of panels.

89. The cabinet of claim 88, wherein said one pair of said screws of said plurality of panels are perpendicular to said other pair of said screws of said plurality of panels so as to provide orthogonal support.

90. The cabinet of claim 89, wherein said one pair of said screws of said plurality of panels are offset from said other pair of said screws of said plurality of panels so as not to interfere with each other.

91. The cabinet of claim 90, wherein a bottom reinforcing block of said plurality of panels is disposed along where said front edge of said bottom panel of said plurality of panels meets said bottom member of said plurality of frame members of said front frame.

92. The cabinet of claim 91, wherein a bottom reinforcing block of said plurality of panels is maintained along where said front edge of said bottom panel of said plurality of panels meets said bottom member of said plurality of frame members of said front frame by two pair of said screws.

93. The cabinet of claim 92, wherein one pair of said screws of said plurality of panels extend through said rear face of said bottom reinforcing block of said plurality of panels and into said bottom member of said plurality of frame members of said front frame.

94. The cabinet of claim 93, wherein the other pair of said screws of said plurality of panels extend through said bottom face of said bottom reinforcing block of said plurality of panels and into said bottom panel of said plurality of panels.

95. The cabinet of claim 94, wherein said one pair of said screws of said plurality of panels are perpendicular to said other pair of said screws of said plurality of panels so as to provide orthogonal support.

96. The cabinet of claim 95, wherein said one pair of said screws of said plurality of panels are offset from said other pair of said screws of said plurality of panels so as not to interfere with each other.

97. The cabinet of claim 96, wherein said joinery has joints;
wherein each joint of said joinery has a female portion.

98. The cabinet of claim 97, wherein each joint of said joinery has a male portion.

99. The cabinet of claim 98, wherein said blind slots of said rear surfaces of said side members of said plurality of frame members of said front frame, respectively, are said female portions of said joinery.

100. The cabinet of claim 99, wherein said top blind slots of said pair of side panels of said plurality of panels, respectively, are said female portions of said joinery.

101. The cabinet of claim 100, wherein said bottom blind slots of said pair of side panels of said plurality of panels, respectively, are said female portions of said joinery.

102. The cabinet of claim 101, wherein said front edges of said pair of side panels of said plurality of panels, respectively, are said male portions of said joinery.

103. The cabinet of claim 102, wherein said pair of side edges of said top panel of said plurality of panels are said male portions of said joinery.

104. The cabinet of claim 103, wherein said pair of side edges of said bottom panel of said plurality of panels are said male portions of said joinery.

105. The cabinet of claim 104, wherein said male portion of each joint of said joinery is defined by a first side wall.

106. The cabinet of claim 105, wherein said male portion of each joint of said joinery is defined by a second side wall.

107. The cabinet of claim 106, wherein said male portion of each joint of said joinery is defined by a bottom wall.

108. The cabinet of claim 107, wherein said first side wall of said male portion of each joint of said joinery is straight.

109. The cabinet of claim 108, wherein said bottom wall of said male portion of each joint of said joinery is straight.

110. The cabinet of claim 109, wherein said bottom wall of said male portion of each joint of said joinery is perpendicular to said first side wall of said male portion of an associated joint of said joinery.

111. The cabinet of claim 110, wherein said second side wall of said male portion of each joint of said joinery contains a substantially wedge-shaped recess.

112. The cabinet of claim 111, wherein said substantially wedge-shaped recess of said second side wall of said male portion of each joint of said joinery is defined by a first wall.

113. The cabinet of claim 112, wherein said substantially wedge-shaped recess of said second side wall of said male portion of each joint of said joinery is defined by a second wall.

114. The cabinet of claim 113, wherein said first wall of said substantially wedge-shaped recess of said second side wall of said male portion of each joint of said joinery is perpendicular to said first side wall of said male portion of an associated joint of said joinery.

115. The cabinet of claim 114, wherein said second wall of said substantially wedge-shaped recess of said second side wall of said male portion of each joint of said joinery extends from said first wall of said substantially wedge-shaped recess of said second side wall of said male portion of an associated joint of said joinery, first as a smooth concave portion for eliminating a high stress area thereat that would be present if said area thereat was not said smooth concave portion of said second wall of said substantially wedge-shaped recess of said second side wall of said male portion of each joint of said joinery, than as a straight portion that is at an angle of between 28 degrees and 38 degrees with said first wall of said substantially wedge-shaped recess of said second side wall of said male portion of said associated joint of said joinery, and then extends to said bottom wall of said male portion of said associated joint of said joinery as a smooth convex portion for eliminating a high stress area thereat that would be present if said area thereat was not said smooth convex portion of said second wall of said substantially wedge-shaped recess of said second side wall of said male portion of said associated joint of said joinery.

116. The cabinet of claim 115, wherein said female portion of said joinery is a complement of said male portion of said joinery so as to allow said male portion of said joinery to slide freely, but securely, in said female portion of said joinery.

* * * * *